(12) United States Patent
Franke et al.

(10) Patent No.: US 7,717,460 B2
(45) Date of Patent: May 18, 2010

(54) AIRBAG

(75) Inventors: Dirk Franke, Berlin (DE); Lutz Eichner, Berlin (DE); Günter Zähle, Berlin (DE); Andreas Terlunen, Mülenbeck (DE)

(73) Assignee: Takata-Petri AG, Aschaffenburg (DE)

( * ) Notice: Subject to any disclaimer, the term of this patent is extended or adjusted under 35 U.S.C. 154(b) by 388 days.

(21) Appl. No.: 11/667,240

(22) PCT Filed: Nov. 30, 2005

(86) PCT No.: PCT/DE2005/002180

§ 371 (c)(1),
(2), (4) Date: May 8, 2007

(87) PCT Pub. No.: WO2006/058531

PCT Pub. Date: Jun. 8, 2006

(65) Prior Publication Data

US 2008/0018084 A1    Jan. 24, 2008

(30) Foreign Application Priority Data

Dec. 2, 2004  (DE) .................. 20 2004 018 987 U
Aug. 5, 2005  (DE) ...................... 10 2005 037 845

(51) Int. Cl.
*B60R 21/16*  (2006.01)

(52) U.S. Cl. ............... 280/743.1; 280/730.1; 280/728.2

(58) Field of Classification Search .............. 280/730.1, 280/743.1, 728.2, 742, 740, 732, 743.2
See application file for complete search history.

(56) References Cited

U.S. PATENT DOCUMENTS

| 5,498,031 | A | 3/1996 | Kosugi |
| 6,092,836 | A | 7/2000 | Saslecov |
| 6,715,789 | B2 * | 4/2004 | Takimoto et al. ......... 280/730.1 |
| 6,962,366 | B2 * | 11/2005 | Fukuda et al. ........... 280/743.1 |
| 7,152,878 | B2 * | 12/2006 | Kai ......................... 280/743.2 |
| 7,182,365 | B2 * | 2/2007 | Takimoto et al. ......... 280/730.1 |
| 2002/0171232 | A1 | 11/2002 | Abe |
| 2003/0184069 | A1 * | 10/2003 | Takimoto et al. ......... 280/743.1 |
| 2004/0178607 | A1 | 9/2004 | Kawauchimaru et al. |
| 2004/0239084 | A1 * | 12/2004 | Mori et al. ............... 280/730.1 |
| 2007/0132215 | A1 * | 6/2007 | Takimoto et al. ......... 280/730.1 |
| 2008/0258441 | A1 * | 10/2008 | Takimoto et al. ......... 280/730.1 |

FOREIGN PATENT DOCUMENTS

EP       1 283 136 A2    2/2003
WO       WO 01/51317 A1  7/2001

* cited by examiner

*Primary Examiner*—Paul N Dickson
*Assistant Examiner*—Drew Brown
(74) *Attorney, Agent, or Firm*—Foley & Lardner LLP

(57) ABSTRACT

The disclosed airbag for a motor vehicle for supporting the knees of a vehicle occupant in the event of a crash, comprises an inflatable portion, a first fastening region for fastening the airbag to a motor vehicle part, at least one second, detachable fastening region for fastening the airbag to the same or different motor vehicle part, and a connection located between the second, detachable fastening region and the inflatable portion. The second, detachable fastening region is configured to detach from the inflatable portion if a force exceeding a predetermined value acts on the connection between the second, detachable fastening region and the inflatable portion.

31 Claims, 5 Drawing Sheets

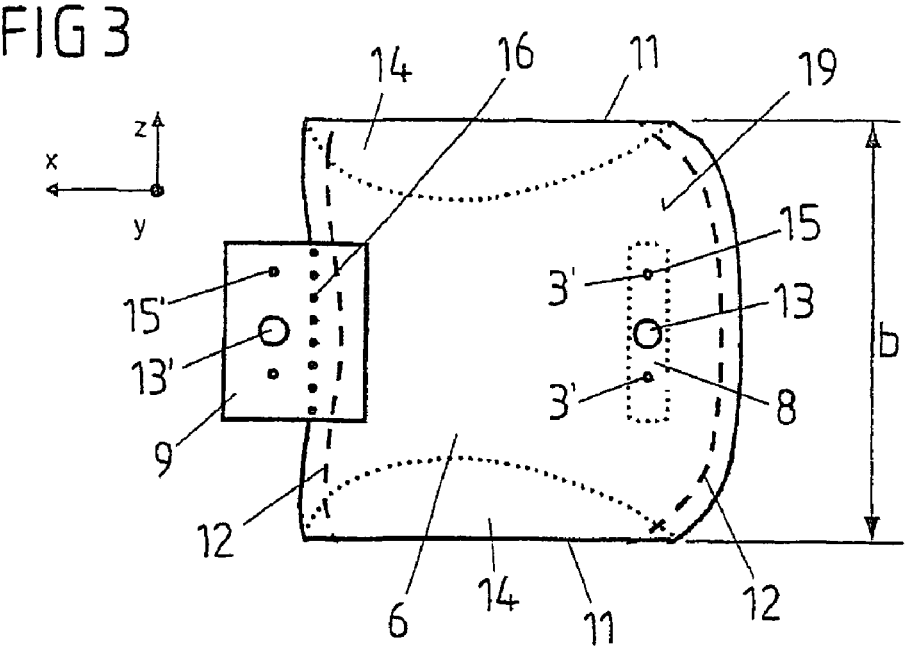
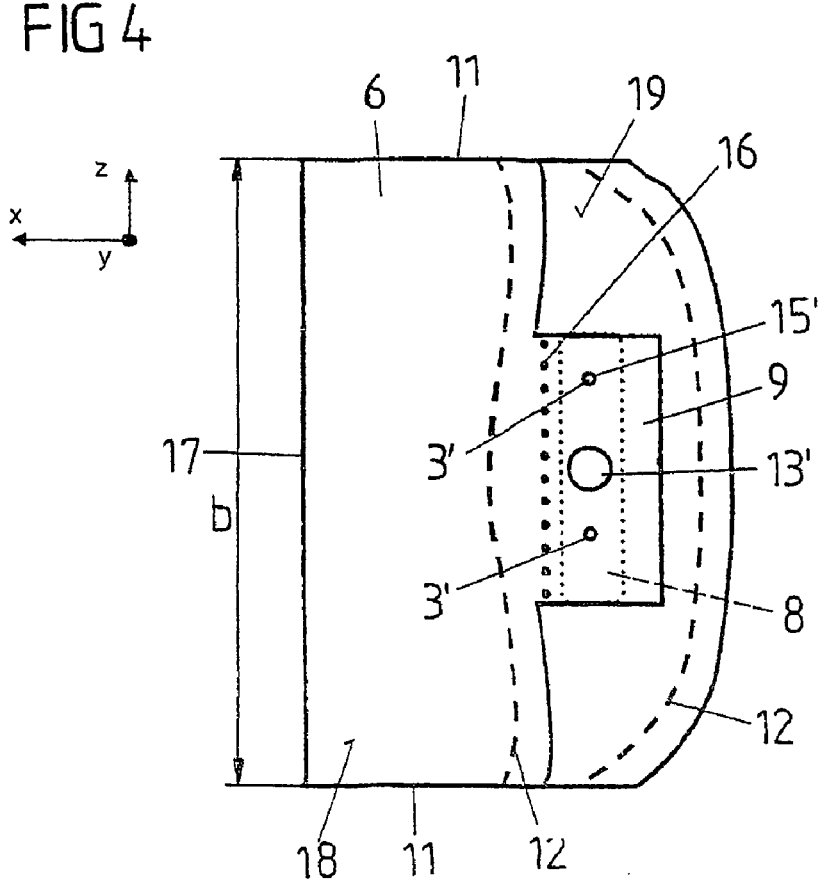

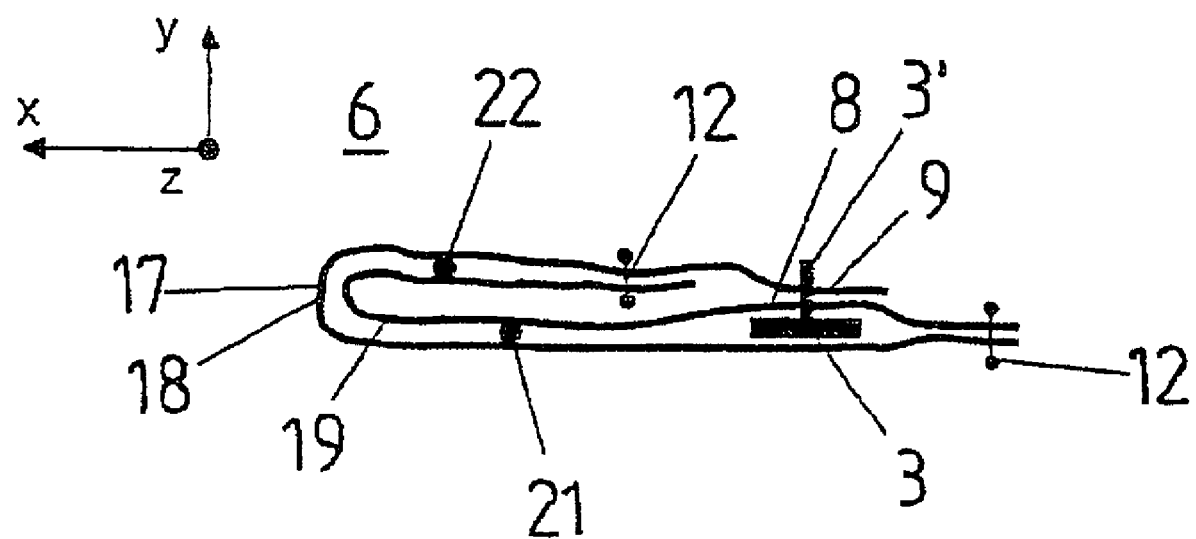

AIRBAG

BACKGROUND

The invention relates to an airbag for a motor vehicle which, in the event of a crash, can be inflated with gas in order to support the knee of a vehicle occupant.

Airbags for supporting the knee of a vehicle occupant are conventionally referred to as knee bags and serve, in an inflated state, to provide impact damping or to support the knee of the vehicle occupant in the event of high accelerations of the motor vehicle. This acceleration relates in particular to negative accelerations in which, as a result of an accident, the motor vehicle is braked in a short time span from a driving movement state.

Airbags of said type have a fastening region with which they are fastened to a motor vehicle part. The airbags are arranged in particular in the region of the lower instrument panel of a motor vehicle.

In the case of known airbags, there is the problem that the design of the instrument panel in the knee region of the vehicle occupant usually makes the arrangement of a knee bag difficult. There is often no space for an airbag directly at the knee region, or the associated knee airbag module must be cumbersomely configured such that it is matched to the design of the instrument panel in the knee region. As a result of the airbag being fastened to a motor vehicle part, it can also be the case that, as a result of the design of the motor vehicle part, the airbag unfolds away from the vehicle part at an unfavorable angle.

SUMMARY

Embodiments of the present invention is based on the object of providing a knee bag whose unfolding direction can be better influenced. The object is achieved by means of an airbag having a first fastening region for fastening the airbag to a motor vehicle part and a second, detachable fastening region which likewise serves for fastening the airbag to a motor vehicle part. The latter motor vehicle part can be the same or a different vehicle part. The second, detachable fastening region and the first fastening region are formed at spaced-apart points of the airbag. The second, detachable fastening region is connected to the airbag in such a way that it detaches from the airbag if a force exceeding a predetermined value acts on the connection between it and the airbag.

The second, detachable fastening region thus serves to fasten the airbag to the motor vehicle part for only as long as the connection is not loaded or is loaded with only a small force. However, if for example the airbag is pulled away, by the action of a force, from the motor vehicle part to which the second, detachable fastening region is fastened, then the airbag detaches from the second, detachable fastening region and therefore also from the motor vehicle part if the force is greater than a predetermined value. The value is determined by the respective material components. Here, the first fastening region does not detach or release from the airbag and provides, as a result of its high stability, rigid and permanent anchoring of the airbag on the motor vehicle.

It is therefore the case that, in the detached state, the second, detachable fastening region no longer serves to fasten the airbag because, although remaining fastened to the motor vehicle part even in the detached state, it is however no longer fastened to the airbag.

The second fastening region serves to influence the unfolding of the airbag as the latter is inflated, because the airbag is connected to the motor vehicle not only at least one fixed fastening region, as is conventional, but also by means of a detachable fastening region. The second, detachable fastening region influences the unfolding of the airbag for at least as long as it is connected to the airbag in an undetached manner. After the second, detachable fastening region has detached, the airbag can unfold freely. A direct unfolding of the airbag in the direction away from the first fastening region is avoided in this way because the airbag is fixedly held during the unfolding process at least at times at a second point, at the second, detachable fastening region. The unfolding process of the airbag is controlled in this way.

At the same time, the solution according to an embodiment of the present invention permits the formation of individual chambers in the airbag, by means of which the unfolding of the airbag during the inflation process can likewise be influenced.

In one particularly preferred embodiment, a tensile force detaches the connection between the second, detachable fastening region and the airbag, which tensile force acts on the connection when the airbag is partially filled with gas. In this way, the second, detachable fastening region detaches from the airbag during the inflation process of the airbag and allows the airbag to fully unfold. Here, the predetermined value is determined such that the tensile force acting on the connection from the partially filled airbag is sufficient to detach the connection. The filling volume at whose attainment the connection is detached is preferably in the range between 30 and 80 percent of the maximum volume. It can be provided that, initially, first regions of the airbag fill with gas and other regions remain unfilled. As the first regions are filled, a tensile force is built up which detaches the second, detachable fastening region from the airbag and enables the other, hitherto unfilled regions to also inflate.

A separating point is preferably formed in the connection between the second, detachable fastening region and the airbag for releasing the connection under the action of a force. The second, detachable fastening region is thereby detached along the separating point and unintended tears in the material of the airbag are avoided.

For example, the second, detachable fastening region is detachably connected to the airbag by means of a tear line, tear seam and/or perforation as a separating point. During the detachment process, then, either the tear line would tear or the tear seam or the second fastening region would be separated along the perforation.

The second, detachable fastening region preferably detaches from the airbag at lower forces then the first fastening region. Although the first fastening region can tear off as a result of a violent, unintentional force action, the first fastening region can nevertheless withstand more intense forces than the second, detachable fastening region. The first fastening region withstands in particular the forces generated when the airbag is inflated. Here, an intended detachment of the second, detachable fastening region from the airbag as a result of the action of a force takes place in such a way that the airbag itself remains capable of supporting the knees of a vehicle occupant. This intended detachment can be provided in that a separating point in the connection of the second, detachable fastening region to the airbag is formed not in the airbag fabric itself but adjacent thereto. In this way, the fabric of the airbag is not damaged during the detachment process and the airbag remains inflatable even without the second, detachable fastening region and can provide a support cushion in the event of a crash. It is thus ensured that no hole or permeable point which would influence the functionality of the airbag is generated in the airbag as a result of the detachment of the second, detachable fastening region.

In one embodiment of the present invention, the second, detachable fastening region is embodied as a projection, in particular as at least one lug-shaped projection on the airbag. The projection can for example be produced from the same material as the airbag itself. Because airbags are conventionally composed of a fabric material, the projection can thus be a protruding fabric piece which detaches from the airbag during the detachment process.

The fastening regions are preferably formed on opposite ends of the airbag. The unfolding of the airbag as the airbag is inflated is influenced to the greatest degree in this way because at least two points of the airbag which are at a maximum distance from one another are fixed in position at least before the detachment.

Here, the fastening regions are formed on opposite ends of the airbag in the longitudinal direction of the motor vehicle in the unfolded state of the airbag. The first, non-detachable fastening region is the furthest remote from the vehicle occupant in the inflated state, while the point at which the second, detachable fastening region was arranged in the undetached state faces toward the vehicle occupant. Two-stage, angled unfolding of the airbag can be obtained in this way.

In one embodiment of the present invention, the first and/or the second, detachable fastening region for fastening to a motor vehicle part is provided in the form of a retaining plate and/or in the form of a housing. The first or the second fastening region is screwed or connected in some other way to the plate or housing.

The first, and in particular also the second, detachable fastening regions advantageously comprise a gas inlet opening through which the airbag can be inflated with gas originating from an inflating device. Here, in the folded state, the airbag is laid over itself in such a way that the first and the second, detachable fastening regions (and therefore the respective gas inlet openings) are arranged congruently on one another in the installed state. The formation of a gas inlet opening in the first region is particularly expedient because the airbag must be connected anyway at one point to a gas generator which can inflate the airbag. The airbag is therefore connected at this point to a part of the motor vehicle in any case. In order to reduce the number of connecting points, a gas inlet opening is then also formed in the second, detachable fastening region, in which the gas inlet opening is arranged congruently above or below the gas inlet opening of the first fastening region.

The first and the second detachable fastening region can, as in the above described exemplary embodiment, be fastened to the same motor vehicle component in order to minimize the number of loaded motor vehicle parts.

The airbag, in the installed state, is preferably folded along one fold in such a way that the fastening regions are formed on regions of the airbag which are separated from one another by the fold. The unfolding process of the airbag can be influenced to a greater degree in this way than if the two fastening regions were arranged on the same side of one fold. In addition, the airbag is then divided by the fold into at least two regions, one of which has the first, non-detachable fastening region (and therefore conventionally also has the gas inlet opening) and the other of which is connected to the second, detachable fastening region. Airbags are conventionally folded in the installed state in order to save space and also to influence, by means of folding, the inflation or unfolding process.

It is particularly preferable for the airbag to be folded along a fold which substantially divides the unfolded airbag in half and about which the two fastening regions are arranged substantially axially symmetrical. Here, too, the influence exerted on the unfolding process is particularly great as a result of the large spacing of the fastening regions, and the fastening in particular permits the airbag to unfold in an angular or "L-shaped" fashion.

It is preferable for the fold, in the installed state of the airbag, to be formed substantially transversely with respect to the longitudinal direction of the motor vehicle. In this way, the two knees of a vehicle occupant are loaded equally when the airbag has reached its unfolded position in which it serves to support the knees of the vehicle occupant. The arrangement of the fold is therefore particularly protective of the knee and is effective.

In one embodiment of the present invention, an additional fold extends substantially parallel to the fold. The additional fold is formed in a region of the airbag which faces away from a gas inlet opening of the airbag. The first fold divides the airbag into a region with the gas inlet opening, which is first filled with gas during the inflation process, and a post-flow region which is prevented from unfolding by the fold. The additional fold in the post-flow region further hinders the unfolding of the post-flow region. Alternatively or in addition, the post-flow region can also be rolled up in order to thereby delay the unfolding.

It is preferable for two side regions of the airbag in its installed state to be turned inward, in the direction of the central point of the airbag, along two side folds which extend in the vehicle longitudinal direction. As a result of the lateral regions being turned inward, the airbag unit is more compact, and can therefore be more easily integrated into an instrument panel of the motor vehicle because the airbag need not be installed into the full width of the instrument panel.

A connection of two inner sides of the airbag is preferably provided in which the connection extends and is arranged substantially transversely with respect to the vehicle longitudinal direction and substantially between the two side folds in such a way that gas flowing into the airbag through a gas inlet opening is conducted into the turned-inward side regions. The connection can be formed, for example, as a seam, an interwoven connection or an adhesive connection. The connection prevents the gas flowing into the central point of the airbag. The gas is initially conducted into the side regions which unfold and thereby provide knee protection for a vehicle occupant in the shortest possible time.

In addition to the prevention of flow into the central region, embodied as a connection, detachable connections can be provided on the inner faces of the airbag in which the detachable connections are arranged at that side of the connection which faces away from the gas inlet opening and extend substantially along the side fold. This configuration has the effect that the gas flowing in first fully inflates the turned-inward side regions and does not merely bypass the fixed connection and then flow back into the central region of the airbag directly thereafter. The second connections are formed so as to be detachable, in particular as tear seams, and open as soon as the side regions have been filled sufficiently and exert predetermined tensile forces on the detachable connections.

In one embodiment of the present invention, it can be provided that the detachable connection arranged closer to the vehicle longitudinal axis is reinforced, for example by means of a second detachable connection which runs at least partially parallel to the first detachable connection. This configuration prevents the airbag from being supported by too great a degree on the central tunnel, and the position of the airbag thereby from being unfavorably displaced.

The object on which an embodiment of the present invention is based is also achieved by means of a method for folding an airbag in which the airbag is folded along a fold in such a way that a first region of the airbag, on which the first fastening region is formed, is separated by the fold from a second region of the airbag, on which the second, detachable fastening region is formed.

BRIEF DESCRIPTION OF THE DRAWINGS

The invention is explained in more detail below on the basis of exemplary embodiments which are illustrated in the figures, in which:

FIG. 3 shows a schematic view of an airbag according to an embodiment of the present invention having one fixed fastening region and one detachable fastening region, with two lateral airbag regions being folded in such a way that the resulting airbag width correlates with a predefined module width;

FIG. 4 shows a schematic view of the airbag of FIG. 3, which is additionally folded transversely with respect to the longitudinal axis in such a way that its two fastening regions lie congruently on one another;

FIG. 5 shows a schematic cross section through the airbag illustrated in FIG. 4;

DETAILED DESCRIPTION

In the figures, identical or similar features are denoted by the same reference symbols.

Figure 1:
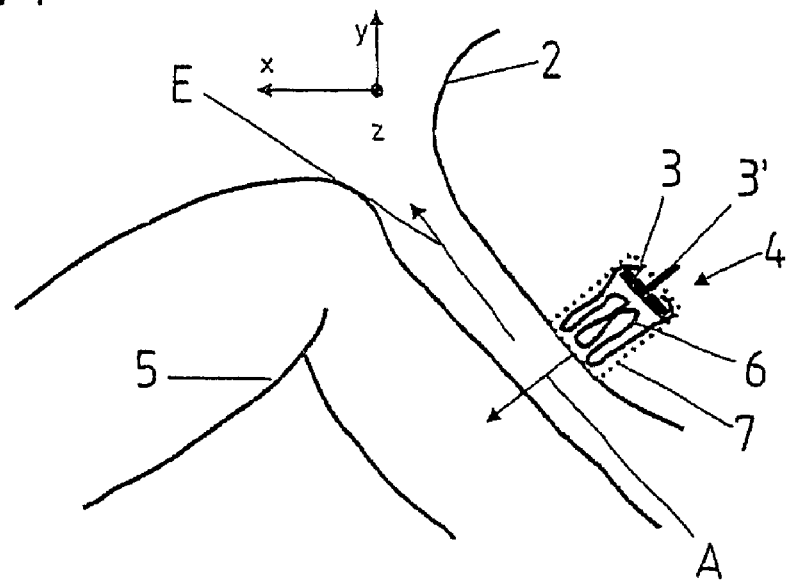
FIG. 1 shows a cross section through an airbag according to an embodiment of the present invention which is arranged below the knee region of a vehicle occupant in an instrument panel.

FIG. 1 shows a cross section through an airbag 6 which is a component of a knee airbag module 4 which is arranged in an instrument panel 2 of a motor vehicle. To clarify the position of the knee airbag module 4, the illustration shows a vehicle occupant 5 or their knee which the airbag 6 serves to protect.

The airbag 6 is fastened to a retaining plate 3 having a fastening projection 3' which is in turn arranged on a module housing 7. The module housing 7, the retaining plate 3, the airbag 6 and a gas generator (not illustrated) for inflating the airbag in the event of a crash form the knee airbag module 4. The retaining plate 3 is arranged on that side of the module housing 7 which faces away from the vehicle occupant 5, in order to thus allow the airbag 6 to unfold freely in the direction of the vehicle occupant 5.

It is generally difficult to position a knee airbag module in a motor vehicle in such a way that, in the event of high negative accelerations, in particular in the event of a crash, it inflates the airbag 6 contained therein such that the knees of a vehicle occupant are optimally protected by the inflated airbag. The difficulty in positioning results from the design of the instrument panel 2 in whose lower region the knee airbag module 4 is arranged. Known knee bags—as the airbags of a knee airbag module are also called—expand only in an ejection direction A which is aligned perpendicularly out of the instrument panel 2 and perpendicularly at the shin bone of the vehicle occupant 5. The knee bag described in the figures expands initially in the ejection direction A, but then later widens, when the airbag 6 is partially filled, in an unfolding direction E which extends substantially parallel to the shin bone of the vehicle occupant 5 and points from the center of the shin bone to his or her knee. In the embodiment illustrated in FIG. 1, the unfolding direction is also substantially parallel to that part of the instrument panel 2 in which the airbag module 4 is arranged. The reason for the airbag 6 initially expanding in the ejection direction A and subsequently unfolding in the unfolding direction E is described in more detail on the basis of the following figures.

Shown in all the figures is a coordinate system with x, y and z axes. The coordinate system is aligned such that its x axis coincides with the vehicle longitudinal axis in which the knee bag is installed. The z axis is perpendicular to the vehicle longitudinal axis x and runs substantially parallel to the vehicle base. The y axis is perpendicular to the vehicle longitudinal axis x and the z axis and runs parallel to the vertical vehicle axis.

The knee airbag module 4 shown in FIG. 1 extends approximately parallel to the z axis and is arranged, for the protection of both knees of the vehicle occupant 5, below the knee region which is to be protected. As a result of the inclination of the instrument panel 2, the ejection direction A of the airbag 6 is inclined downward in relation to the horizontal vehicle longitudinal axis x. The unfolding direction E extends approximately at right angles to the ejection direction A; and the unfolding of the airbag 6 must therefore be deflected approximately perpendicularly. The special arrangement of the knee airbag module 4 has the advantage that, on the one hand, the firmly inflated airbag does not impact directly against the sensitive kneecap of the occupant 5, and on the other hand, space is available above for other vehicle fittings such as for example a glove compartment or steering column.

Figure 2:
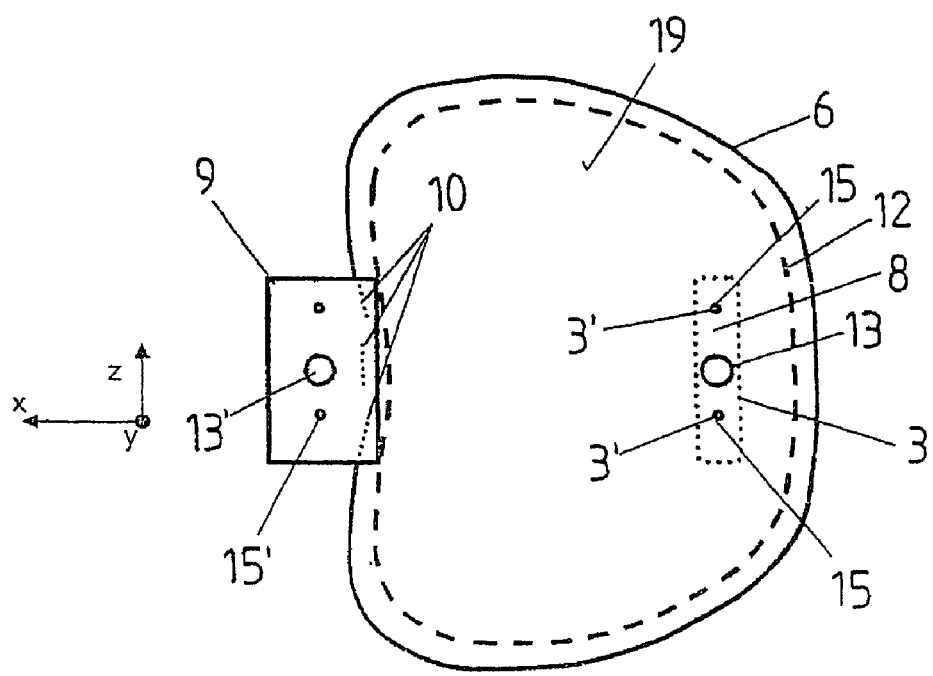
FIG. 2 shows a schematic view of an airbag according to an embodiment of the present invention in an uninflated and unfolded state having one fixed fastening region and one detachable fastening region.

FIG. 2 shows the airbag 6 in an unfolded and uninflated state. The airbag 6 is composed substantially of two congruent fabric layers (an upper sheet and a lower sheet) which are arranged congruently on one another and are connected to one another in their edge region by a seam 12. Alternatively, the upper and lower sheets could also be adhesively bonded to one another or fastened to one another in some other way. FIG. 2 shows only the upper sheet 19 which covers the lower sheet situated below it. The retaining plate 3 is arranged in the interior of the airbag 6, the at least one fastening projection 3' (for example a threaded bolt) of the retaining plate 3 projects out of the airbag 6 at fastening openings 15 through the upper sheet 19.

In the airbag 6 shown in FIG. 2, two fastening openings 15 are provided which are each arranged adjacent to a gas inlet opening 13 in the z direction. Through the gas inlet opening 13, the airbag can be inflated by means of a gas generator (not illustrated). The region of the upper sheet 19 below which the retaining plate 3 is arranged, and in which both the two fastening openings 15 and also the gas inlet opening 13 are formed, forms a first fastening region 8. The fastening region 8 is a fixed fastening region which cannot be detached from the airbag and serves to fasten the airbag 6 to the knee airbag module 4 or to its module housing 7 and therefore to a part of the motor vehicle. A violent, unintentional tearing away of the fastening region 8, which has the retaining plate 3 arranged below it, from the airbag 6 would make the airbag incapable of functioning because this tearing away would damage the airbag 6.

The fastening region 8 is situated in the upper sheet 19, specifically close to that end of extent of the airbag 6 in the x direction which is remote from the vehicle occupant, that is to say which points in the direction of the front of the vehicle.

Spaced apart from the first fastening region 8 in the x direction is a flexible lug 9 which is arranged at that end of extent of the airbag 6 which points towards the vehicle occupant 5 or in the direction of the rear of the vehicle. The lug 9 is formed from airbag fabric but can also alternatively be composed of another, preferably flexible material.

Formed in the lug 9 are two fastening openings 15' and one gas inlet opening 13' which are spaced apart from one another to exactly the same extent as the two fastening openings 15 and the gas inlet opening 13 of the fastening region 8. The fastening openings and gas inlet openings are in fact pivoted so as to be arranged congruently over one another in the installed state (cf. FIG. 4). The lug 9 has tear seams 10, by means of which it is connected to the airbag 6. The tear seams 10 or the thread with which the tear seams are sewn have a significantly lower tear resistance than the lug 9 itself. Therefore, during a relative movement of the lug 9 in relation to the airbag 6, the lug breaks away from the latter when a specified tensile force is reached. During the detachment process, the entire lug 9 separates from the airbag 6 by virtue of the tear seams 10 being torn. The force required for detaching the lug 9 from the airbag 6 is determined by the length of the tear seams 10, the seam design and the thread strength used.

Together with the tear seams 10, the lug 9 forms a second fastening region of the airbag which can be detached from the airbag and which, like the first fastening region 8, can be fastened in the module housing 7 of the knee airbag module 4.

FIG. 3 shows an alternative embodiment of the airbag 6 which is initially arranged like the airbag 6 of FIG. 2. The airbag 6 of FIG. 3 is folded along two side folds 11 in such a way that two side regions 14 are turned inward towards the central point of the airbag 6. The side folds 11 run parallel to the vehicle longitudinal axis x and also substantially parallel to the direct connecting axis of the two fastening regions 8 and 9. The side regions 14 of the airbag 6 are folded into the airbag 6 to such an extent that the airbag 6 has, in its z direction of extent, a module width b which corresponds to the width of the knee airbag module 4. The side regions 14 therefore no longer project beyond the lateral extent of the knee airbag module 4 when the airbag 6 is inserted into the knee airbag module 4.

The airbag 6 can be folded either by folding over or turning inward the lateral regions 14, and constitutes a first step of folding the airbag.

Alternatively to the airbag 6 of FIG. 2, the lug 9 of the airbag 6 in FIG. 3 is fixedly connected to the airbag 6 by means of a continuous seam 12 which serves to connect the upper and lower sheets. A perforation 16 is formed in the lug 9, along which the lug 9 is torn in two during the detachment process and which separates that part of the lug 9 in which the fastening openings 15' and the gas inlet opening 13' are formed from that part which is still fastened to the airbag 6. In this case, therefore, only the detachable part of the lug 9 forms the second, detachable fastening region of the airbag 6, while the rest of the lug remains fastened to the airbag 6 as a remainder by means of the seam 12.

FIG. 4 shows a second folding step of a further airbag 6 which was also folded like that of FIG. 3. The airbag 6 is folded along a fold 17 which runs in the z direction. The fold 17 is perpendicular to an imaginary connecting line (not shown) between the two fastening regions, and intersects the connecting line precisely in the center between the two gas inlet openings 13 and 13'.

The airbag 6 is folded along the fold 17 in such a way that the fastening openings 15' of the lug 9 each come to rest on the fastening openings 15 of the fastening region 8. The same applies to the gas inlet opening 13'.

In the left-hand half of FIG. 4, the lower sheet 18 is situated on that side (the upper side) of the airbag 6 which faces towards the viewer, while in the right-hand half, a part of the airbag 6, in which the upper sheet 19 covers the lower sheet 18 arranged below it, projects from under the lug 9.

The folding is carried out in such a way that the width of the airbag 6 still corresponds to the module width b. The side folds 11, which laterally delimit the airbag, run parallel to the x axis.

In the airbag 6 of FIG. 4, the lug 9—in contrast to the preceding exemplary embodiments—is embodied as a projection of the lower sheet 18 and has, like the lug 9 of the airbag of FIG. 3, a perforation 16 which permits a detachment of the lug 9 from the airbag 6. It is also conceivable for the lug 9 to instead be formed as a projection of the upper sheet 19 and be provided with a perforation.

FIG. 5 shows a cross section through the airbag 6 shown in FIG. 4. The fastening projection 3' of the retaining plate 3 extends through the fastening openings 15 of the fastening region 8 and through the fastening openings 15' of the lug 9 arranged above the fastening region 8. The fold 17 points towards the vehicle occupant 5 shown in FIG. 1 (or towards the rear of the vehicle). The airbag is folded in such a way that, as a result of the fold 17, the upper sheet 19 comes to rest on itself at the inside of the airbag 6. The airbag 6 in said folded form is substantially outwardly delimited by the lower sheet 18. During further assembly into the module housing 7 and into the motor vehicle, the airbag 6 which is pre-folded in this way is connected and fixedly clamped to the module housing 7 by means of the fastening projections 3'. At the same time, the fastening projections 3' serve to fix the lug 9 to the housing. The airbag is then folded up further and stored in the module housing 7.

As an alternative to said mode of installation, the airbag 6 can also be fully folded outside the module housing 7 and subsequently connected to the housing. The installed state of the airbag 6 and that of the knee airbag module 4 is shown in FIG. 1.

The unfolding process of the airbag 6 is described as follows with reference to FIGS. 1 and 5. After an ignition of the gas generator (not illustrated), gas flows through the inflow opening 13' and the inflow opening 13 arranged below the inflow opening 13'. While the inflow opening 13' only connects two opposite sides of the lug 9 and is therefore traversed by flow without any effect, the inflow opening 13 connects the interior of the airbag 6 to the exterior and serves to inflate the airbag 6. The gas flows through the inflow opening 13 and a cut-out in the retaining plate 3 into a direct inflow region 21 of the airbag 6 (cf. FIG. 5). Here, the airbag 6 unfolds in the ejection direction A (cf. FIG. 1).

As a result of the fold 17, an overflow of the gas from the direct inflow region 21 into a post-flow region 22 of the airbag 6 is avoided or reduced. The direct inflow region 21 encloses that region in the interior of the airbag 6 which comprises the gas inlet opening 13, by means of which the interior of the airbag 6 is connected to a gas generator (not illustrated), and which is delimited by the seams 12 and at least the fold 17. In the example shown, the direct inflow region 21 is also delimited by the two side folds 11.

During the filling process of the direct inflow region 21, initially the side regions 14 are turned outward with the side folds 11 being flattened. As a result, the extent of the airbag 6 in the x direction widens beyond the module width b and serves to protect both knees of a vehicle occupant 5. The knees of the vehicle occupant 5 are, in the ideal position, arranged one behind the other in the z direction.

The gas-filled direct inflow region 21 forms, between the shin bones of the vehicle occupant 5 and the instrument panel 2, a first bubble on which the remaining airbag regions can be supported in the downward direction as the unfolding progresses. The inflated direct inflow region 21 of the airbag 6 serves to prevent the remaining airbag regions from unfolding into the footwell of the motor vehicle. This is because the direct inflow region 21, in its installed position, is arranged on that side of the knee airbag module 4 which faces towards the vehicle base.

If the inner pressure in the airbag 6 exceeds a predetermined level, the connection between the lug 9 and the airbag 6 detaches on account of a resulting tensile force at the point, which is predefined as a separating point, between the lug 9 and the airbag (tear seams 10 or perforation 16). The post-flow region 22 is thereafter no longer held on the motor vehicle by means of the lug 9 and can move out of the module housing 7. The post-flow region 22 fills completely with gas which flows into it from the direct inflow region 21 via the flattening fold 17.

The already inflated direct inflow region 21 prevents a propagation of the post-flow region 22 in the direction of the feet of the vehicle occupant 5, and thereby causes the post-flow region 22 to unfold upward into the knee region of the vehicle occupant 5. The second unfolding stage takes place in the unfolding direction E (cf. FIG. 1). In the event of the impact of the shin bones and knees of the vehicle occupant 5 against the airbag 6, the airbag extends from the fastening region 8 in the unfolding direction E up to the knees of the occupants. Said arrangement ensures optimum positioning and unfolding of the airbag 6.

Figure 6:
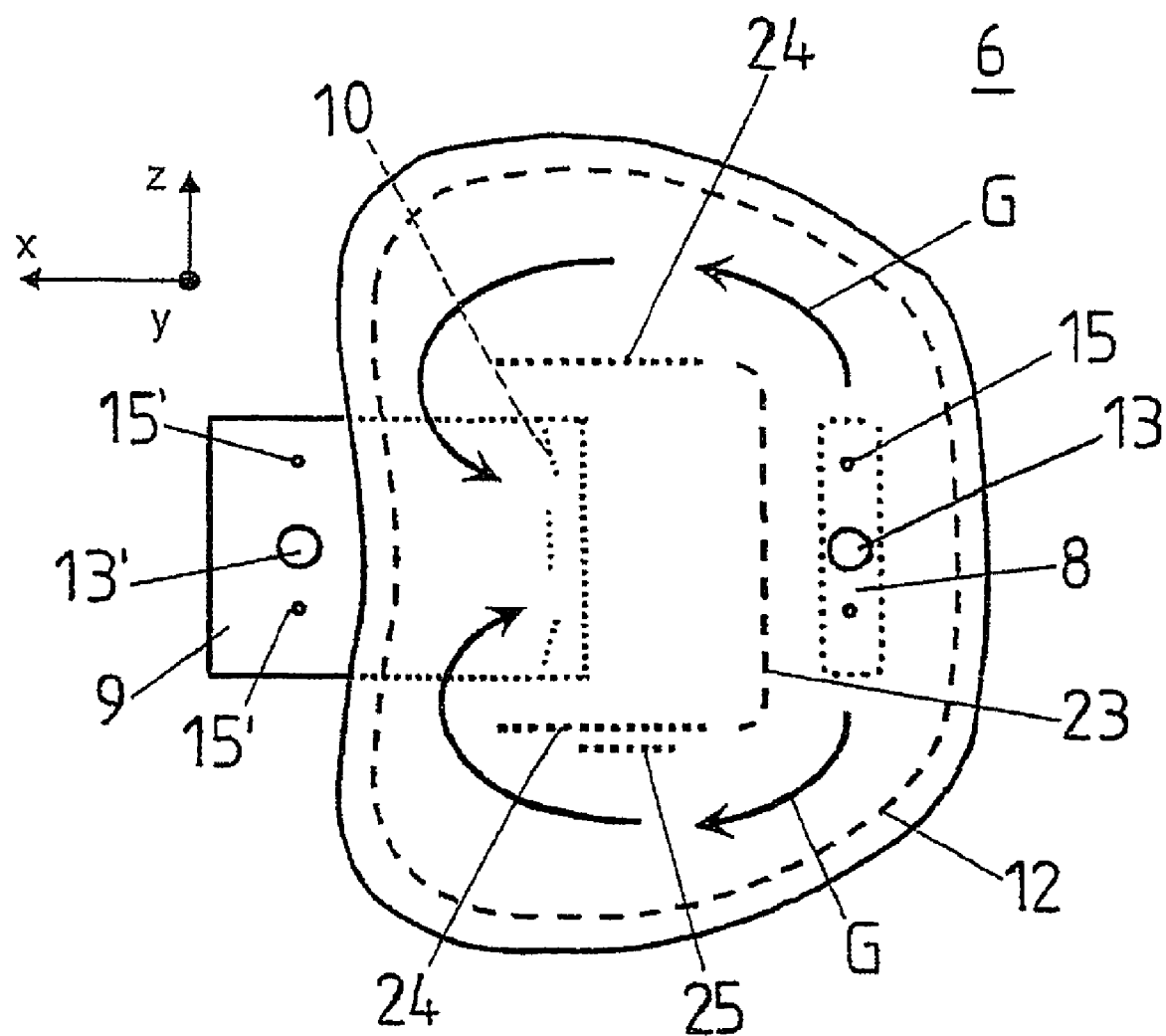
FIG. 6 shows a schematic view of an airbag according to an embodiment of the present invention in an uninflated and unfolded state having one fixed fastening region and one detachable fastening regions in which the airbag has additional seams for influencing its inflation behavior.

The airbag 6 shown in FIG. 6 in the unfolded and uninflated state serves to further improve the inflation behavior in comparison to the airbags of FIGS. 1 to 5. The airbag 6 corresponds for the most part to the airbag illustrated in FIG. 2. In contrast, however, the second, detachable fastening region 9 is connected to the lower sheet of the airbag in the region of the subsequent fold 17 (cf. FIG. 4) by means of tear seams 10.

A fixed connecting seam 23, which connects the upper and lower sheets fixedly to one another, is sewn between the gas inlet opening 13 and the central point of the airbag 6 in the z direction, that is to say transversely with respect to the vehicle longitudinal axis. The connecting seam 23 prevents gas from the gas inlet opening 13 flowing directly in the direction of the central point of the airbag as the airbag 6 is inflated. The gas flowing in is instead conducted into the lateral regions of the airbag along a gas flow direction G. Here, the fixed connecting seam need not be 100% air-tight but can also be formed to be slightly permeable to gas. It is essential here that the majority of the gas initially flows into the side regions.

As the gas flows into the airbag 6, as a result of the connecting seam 23, initially the side regions which (as shown in FIG. 3) are turned inward along two side folds 11 in the installed state are unfolded. This configuration is advantageous because, in this way, the knee bag reaches its maximum functional width in the shortest possible time. As a result of the lateral folding in or turning in of the lateral regions 14 (cf. FIG. 3) to the module width, without the connecting seam 23, initially the central airbag region situated in between would be filled. The bubble thereby formed under some circumstances pushes the knees of the vehicle occupant to be protected away from one another which is unfavorable for subsequent retention. This is the case in particular if the passenger has their knees in a spread-apart position. The connecting seam 23 therefore ensures protection over the full airbag width.

The connecting seam 23 extends substantially from one side fold 11 to the other in order to conduct the greatest possible proportion of gas into the lateral regions.

Parallel to the two side folds 11, the airbag has tear seams 24 which run in the vehicle longitudinal direction from the ends of the connecting seam 23 away from the gas inlet opening 13. The tear seams 24 prevent gas flowing back into the central region of the airbag 6 directly after flowing around the connecting seam 23. The tear seams 24 serve to keep the gas in the lateral regions until the latter are almost completely filled with gas and apply a predetermined tension which tears the tear seams. As a result, the upper and lower sheets are no longer held connected to one another along the tear seams 24, and thereby permit the airbag 6 to fill completely. The tear seams 24 are detachable connections in order to provide a sufficient airbag depth for the dissipation of energy during subsequent cushioning of the knees.

In the exemplary embodiment shown in FIG. 6, a tear seam 24 is reinforced by a likewise detachable reinforcement 25. A single-sided reinforcement of this type can be provided either in that a plurality of tear seams are provided on one side, in that a higher tearing force is necessary for tearing one tear seam than is necessary for the other, or else in that overall, only one tear seam is provided on one side. The double tear seam hinders the unfolding of the airbag at one side, for example in the direction of the central tunnel. The double tear seam is arranged on that side of the airbag which, in the installed state, faces toward the central tunnel of the vehicle. If the airbag unfolds fully in said direction too early, then an undesired support action on the central tunnel is obtained.

As an alternative to the embodiment illustrated in FIG. 6, the airbag can also have the fixed connecting seam 23 and two equal-length tear seams 24 without the reinforcement 25. Optimum unfolding is obtained here in that the tear seam 24 facing toward the central tunnel is designed to be reinforced, for example by means of a reduced stitch width or an increased thread strength.

Figure 7:
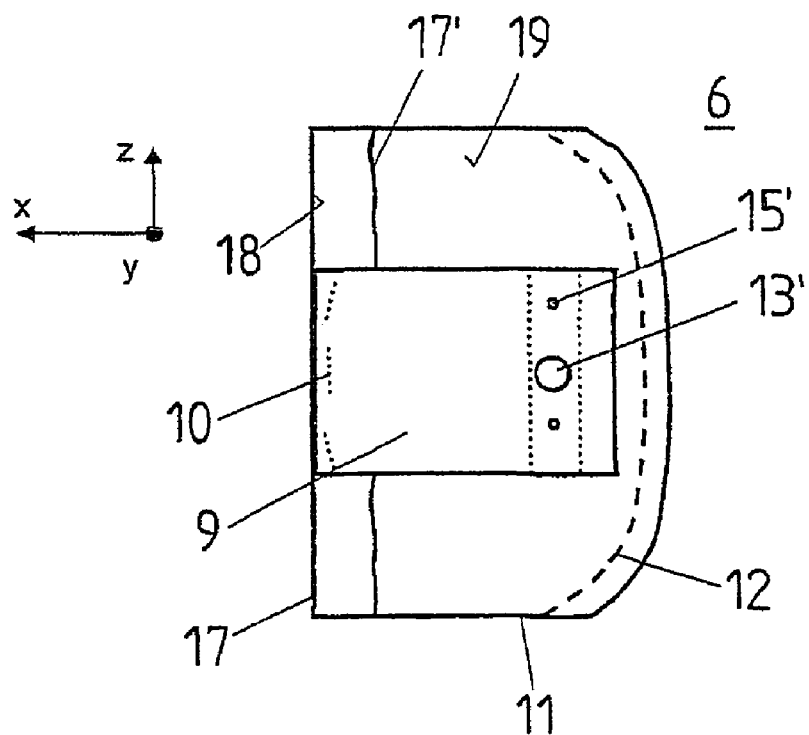
FIG. 7 shows a schematic view of an airbag according to an embodiment of the present invention which is divided by a fold into a direct inflow region and a post-flow region, with the post-flow region having an additional fold.
Figure 8:
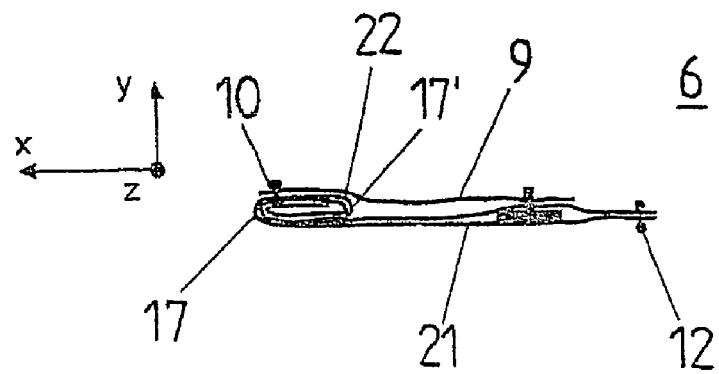
FIG. 8 shows a schematic cross section through the airbag of FIG. 7, doubly folded in the vehicle transverse direction.

FIGS. 7 and 8 show a further way of folding the airbag 6 having a detachable fastening region 9. As in the exemplary embodiments shown in FIGS. 4 and 5, the airbag 6 is folded along a fold 17 in such a way that the first fastening region 8 comes to rest below the second, detachable fastening region 9, and the two gas inlet openings 13 and 13' come to rest congruently on one another. Parallel to the fold 17, the airbag is folded again by an additional fold 17', specifically in the post-flow region 22 of the airbag. The inflation of the post-flow region 22 is thereby delayed not only by the fold 17 but additionally by the additional fold 17'. As an alternative to a second fold, the post-flow region 22 can also be rolled up in order to obtain a delay effect.

The priority application, German Application DE 20 2004 018 987.9, filed on Dec. 2, 2004, and DE 10 2005 037 845.5, filed on Aug. 5, 2005, are hereby incorporated by reference in their entireties.

The invention claimed is:

1. An airbag for a motor vehicle for supporting knees of a vehicle occupant in an event of a crash, comprising:
   an inflatable portion;
   a first fastening region for fastening the airbag to a motor vehicle part;

at least one second, detachable fastening region for fastening the airbag to the same or different motor vehicle part; and a given connection located between the second, detachable fastening region and the inflatable portion, wherein the second, detachable fastening region and the first fastening region are formed at spaced-apart points on the airbag, wherein the second, detachable fastening region is configured to detach from the inflatable portion if a force exceeding a predetermined value acts on the given connection between the second, detachable fastening region and the inflatable portion, wherein the first fastening region and the second, detachable fastening region are formed from a fabric from which the inflatable portion is also formed, wherein two side regions of the inflatable portion in an installed state of the airbag are turned inward or folded over in a direction of a central point of the airbag along two side folds which extend in a vehicle longitudinal direction, wherein the inflatable portion comprises two airbag layers connected by a first connection which extends substantially transversely with respect to the vehicle longitudinal direction and substantially between the two side folds, and wherein detachable connections extending substantially along the two side folds connect the two airbag layers.

2. The airbag as claimed in claim 1, wherein the force that detaches the second, detachable fastening region from the inflatable portion is a tensile force, and wherein the tensile force acts on the given connection when the airbag is partially filled with gas.

3. The airbag as claimed in claim 1, wherein the second, detachable fastening region is detachably connected to the inflatable portion by a tear line, a tear seam, a perforation, or any combination thereof as a separating point formed on the given connection.

4. The airbag as claimed in claim 3, wherein the first fastening region is configured to be fastened to its respective motor vehicle part even in an inflated state of the airbag.

5. The airbag as claimed in claim 1, wherein the airbag is configured such that the intended detachment of the second, detachable fastening region from the inflatable portion as a result of the force exceeding the predetermined value takes place such that the airbag itself remains capable of supporting the knees of the vehicle occupant.

6. The airbag as claimed in claim 1, wherein the second, detachable fastening region is configured to detach from the inflatable portion at lower forces than for detachment of the first fastening region.

7. The airbag as claimed in claim 1, wherein the second, detachable fastening region comprises a projection on the inflatable portion.

8. The airbag as claimed in claim 7, wherein the projection of the second, detachable fastening region comprises at least one lug-shaped projection.

9. The airbag as claimed in claim 1, wherein the first and second fastening regions are formed on opposite ends of the airbag.

10. The airbag as claimed in claim 9, wherein the first and second fastening regions are formed on opposite ends of the airbag in the vehicle longitudinal direction in an unfolded state of the airbag.

11. The airbag as claimed in claim 1, wherein the first fastening region comprises a retaining plate, a housing, or a combination thereof.

12. The airbag as claimed in claim 11, wherein the second, detachable fastening region comprises a retaining plate, a housing, or a combination thereof.

13. The airbag as claimed in claim 1, wherein the first fastening region comprises a first gas inlet opening through which the inflatable portion can be inflated with gas originating from an inflating device.

14. The airbag as claimed in claim 13, wherein the second, detachable fastening region comprises a second gas inlet opening arranged on the first gas inlet opening of the first fastening region in the installed state of the airbag such that the inflatable portion can be inflated with gas which flows in through both first and second gas inlet openings.

15. The airbag as claimed in claim 14, wherein the airbag is folded such that, in the installed state, the first fastening region and the second, detachable fastening region are arranged congruently on one another.

16. The airbag as claimed in claim 1, wherein the first fastening region and the second, detachable fastening region have same dimensions.

17. The airbag as claimed in claim 1, wherein the airbag is folded along one fold such that the first and second fastening regions are formed on regions of the airbag which are separated from one another by the one fold.

18. The airbag as claimed in claim 17, wherein the one fold substantially divides the airbag in half, wherein the first and second fastening regions are arranged substantially axially symmetrically on the airbag.

19. The airbag as claimed in claim 17, wherein, in the installed state of the airbag, the one fold is formed substantially transversely with respect to the vehicle longitudinal direction.

20. The airbag as claimed in claim 17, further comprising a gas inlet opening and an additional fold extending substantially parallel to the one fold wherein the additional fold is formed in a region that faces away from the gas inlet opening, wherein the region that faces away from the gas inlet is rolled up.

21. The airbag as claimed in claim 1, wherein, in the installed state of the airbag, the second, detachable fastening region is arranged above the first fastening region.

22. The airbag as claimed in claim 1, wherein the two side regions of the inflatable portion in the installed state are turned inward in the direction of the central point of the airbag along the two side folds which extend in the vehicle longitudinal direction.

23. The airbag as claimed in claim 1, wherein the inflatable portion comprises a gas inlet opening and wherein the first connection extends substantially transversely with respect to the vehicle longitudinal direction and substantially between the two side folds such that gas flowing into the inflatable portion through the gas inlet opening is conducted into the turned-inward or folded-over side regions.

24. The airbag as claimed in claim 23, wherein the inflatable portion comprises a gas inlet opening, and wherein the detachable connections are arranged at a side of the first connection which faces away from the gas inlet opening and extend substantially along the two side folds.

25. The airbag as claimed in claim 24, wherein one of the detachable connections is reinforced.

26. A knee air bag module for a motor vehicle for supporting knees of a vehicle occupant in an event of a crash, comprising:
  an airbag, wherein the air bag comprises:
    an inflatable portion;
    a first fastening region for fastening the airbag to a motor vehicle part;

at least one second, detachable fastening region for fastening the airbag to the same or different motor vehicle part; and a given connection located between the second, detachable fastening region and the inflatable portion, wherein the second, detachable fastening region and the first fastening region are formed at spaced-apart points on the airbag, wherein the second, detachable fastening region is configured to detach from the inflatable portion if a force exceeding a predetermined value acts on the given connection between the second, detachable fastening region and the inflatable portion, wherein the first fastening region and the second, detachable fastening region are formed from a fabric from which the inflatable portion is also formed, wherein two side regions of the inflatable portion in an installed state of the airbag are turned inward or folded over in a direction of a central point of the airbag along two side folds which extend in a vehicle longitudinal direction, wherein the inflatable portion comprises two airbag layers connected by a first connection which extends substantially transversely with respect to the vehicle longitudinal direction and substantially between the two side folds, and wherein detachable connections extending substantially along the two side folds connect the two airbag layers.

27. The knee air bag module as claimed in claim 26, further comprising a gas generator.

28. The knee air bag module as claimed in claim 27, wherein the knee air bag module is configured to be arranged in an instrument panel of the motor vehicle.

29. A vehicle, comprising:

a knee air bag module for supporting knees of a vehicle occupant in an event of a crash comprising an airbag, wherein the airbag comprises:

an inflatable portion;

a first fastening region for fastening the airbag to a motor vehicle part;

at least one second, detachable fastening region for fastening the airbag to the same or different motor vehicle part; and a given connection located between the second, detachable fastening region and the inflatable portion, wherein the second, detachable fastening region and the first fastening region are formed at spaced-apart points on the airbag, wherein the second, detachable fastening region is configured to detach from the inflatable portion if a force exceeding a predetermined value acts on the given connection between the second, detachable fastening region and the inflatable portion, and wherein the first fastening region and the second, detachable fastening region are formed from a fabric from which the inflatable portion is also formed, wherein two side regions of the inflatable portion in an installed state of the airbag are turned inward or folded over in a direction of a central point of the airbag along two side folds which extend in a vehicle longitudinal direction, wherein the inflatable portion comprises two airbag layers connected by a first connection which extends substantially transversely with respect to the vehicle longitudinal direction and substantially between the two side folds, and wherein detachable connections extending substantially along the two side folds connect the two airbag layers.

30. The airbag as claimed in claim 1, wherein the first connection is a first connecting seam.

31. The airbag as claimed in claim 1, wherein the detachable connections are detachable connecting seams.

* * * * *